March 28, 1939.  H. A. WADMAN  2,151,876
APPARATUS FOR FORMING GLASSWARE
Filed Jan. 18, 1934  4 Sheets-Sheet 1

Witness:
A. A. Horn

Inventor:
Harold A. Wadman
by Brown + Parham
Attorneys.

March 28, 1939.  H. A. WADMAN  2,151,876
APPARATUS FOR FORMING GLASSWARE
Filed Jan. 18, 1934  4 Sheets-Sheet 4

Witness:
A. A. Horn

Inventor:
Harold A. Wadman
by Bruns & Parham
Attorneys.

Patented Mar. 28, 1939

2,151,876

UNITED STATES PATENT OFFICE 2,151,876

APPARATUS FOR FORMING GLASSWARE

Harold A. Wadman, West Hartford, Conn., assignor to Hartford-Empire Company, Hartford, Conn., a corporation of Delaware Application January 18, 1934, Serial No. 707,060

10 Claims. (Cl. 49—9)

My invention relates to apparatus for forming hollow glassware. More particularly it comprises the improvements in apparatus in which each charge is operated upon by a blank mold and a finishing mold, which improvements make for a more efficient use of the mold equipment.

Heretofore in the formation of glass by the use of the blank mold-finishing mold method (hereinafter referred to as the "two-mold method"), it has been customary to treat each charge of glass in three essential stages up to the time the glass is set up sufficiently to permit opening the blow mold. These stages comprise—

(1) A blank mold contact stage beginning with the receipt of the charge in the blank mold and continuing until the blank mold is opened. During this stage, a definite and controlled amount of heat is extracted from the charge and a blank is formed.

(2) A reheating stage during which the blank is maintained out of contact with the body molds and in which a redistribution of the heat of the blank takes place, the hotter interior glass giving up a proportion of its heat to the chilled surface glass.

(3) The finishing mold contact time during which the reheated parison is blown to finished form in a finishing mold and heat is extracted from the glass by the finishing mold until the glass is sufficiently set to permit its removal.

Heretofore, automatic machines used commercially have provided but two stations or positions (whether fixed or moving) at which these three stages of treatment take place upon a given charge of glass. The reheating stage normally takes place while the glass is either in a closed finishing mold or in a position in which the blank would be enclosed by a mold were that mold closed.

Obviously, such arrangements render one or both of the molds useless to perform heat extracting or molding functions during the reheat stage. As the length of the reheating stage may exceed the molding stage in either mold, a very substantial loss in the effective use of the molds necessarily occurs.

My present invention is based upon the concept that the reheating function may be efficiently performed away from the positions of the blank and finishing molds (if closed) and that the blank and finishing molds may be employed in moulding and heat extracting operations on the charges of glass during the reheating of the blanks. By this invention, therefore, a much higher mold efficiency may be maintained than heretofore has been considered possible.

A commercial machine which has as complete provisions for relatively efficient operation of the molds as any practical prior art machine was introduced commercially into the art something over ten years ago and is now well known as the "Hartford I. S." machine. This machine is adequately illustrated in the patents to Henry W. Ingle, Nos. 1,843,160 and 1,911,119.

As the embodiment of my invention particularly illustrated herein involves a machine of somewhat similar type, the novel features of my present invention may best be pointed out by a comparison of the provisions made in the "I. S." machine with those of the present embodiment of my invention, it of course being understood that the present invention is not limited to the particular type of machine illustrated.

The "I. S." machine employs the "two-mold" method of forming glassware and provides for the usual three stages essential to that method. It provides for variations of the glass forming cycle and may be set so that the reheating of parisons may take place partly within the wholly or partially open blank molds and partly within the closed finishing molds, and may be adjustably shifted to occur to a greater extent in either mold. With the exception of a relatively brief time occupied by the transfer of a parison from its blank mold to its finishing mold, the glass being formed occupies the position either of the blank mold or the finishing mold throughout all the glass forming stages. Thus there is in the "I. S." machine no provision for substantial reheating of the parison away from the mold positions, and hence it is impossible for the "I. S." machine to maintain more than two charges of glass in process of formation at the same time in the same unit or section. While provision is made in the "I. S." machine for overlapping the time of operations of the cooperating blank and finishing molds in forming successive charges fed to the blank mold, no provision is made for an overlapping of the three stages of glass formation in a given section or unit.

By my present invention, I substantially increase the effective use of the molds by removing the reheat completely or very substantially from the positions of the molds; and employing the time so saved in effecting actual molding and heat-extracting operations in the molds.

*Definitions of terms used*

The term "multiple overlapping cycle" as used herein comprises a cycle of operations of a "two-mold" type machine wherein three or more charges of glass, all of which are successively supplied to a single blank mold, are in some stage or process of formation at the same time. For example, one cycle which may be considered to be included in the term "multiple overlap" is one in which one charge has been supplied to and is enclosed by the blank mold (positive forming operations may or may not have been initiated thereon), one or more charges previously supplied to the same blank mold and formed into blanks therein is or are reheating out of registry and out of contact with any body mold surface, and another charge which has been previously supplied to the same blank mold, formed into a parison therein and reheated as aforesaid, has been transferred to and is enclosed within a finishing mold and may be either continuing to reheat therein, may have blowing pressure applied thereto, or may be cooling in the finishing mold after the completion of the application of final blowing pressure.

When but one parison is reheating as above set forth and three charges are simultaneously in process, the cycle may be referred to as the "triple overlapping cycle."

The expression "out of registry", as used herein to define the positions of reheat of parisons, includes any position, moving or stationary, in which the parison is so supported as to be out of any position it might occupy in either a blank mold or a finishing mold should such molds be closed. For example, a parison supported vertically above and in axial alignment with the position in which the finishing mold might be closed around it would be termed "out of registry" with this finishing mold, even though this reheating position would be in axial alignment with the position which the parison must occupy in order to be enclosed by such finishing mold.

Among the objects of my present invention is to provide apparatus for forming hollow glass articles comprising a blank mold and a finishing mold and cooperating mechanisms in which the reheating stage is largely or wholly performed while the glass is out of registry with both the blank and the finishing molds, while permitting an efficient use of the molds.

A further object of the present invention is to provide apparatus for forming hollow glass articles by a multiple overlapping cycle as set forth above.

A further object of the invention is to provide apparatus for forming hollow glassware in a cycle in which three or more charges of glass are in process of formation simultaneously and in which a blank mold and a blow mold always cooperate solely with each other.

A further and more specific object of the present invention is to provide apparatus including a blank mold and a blow mold each cooperating solely with the other and means for effecting transfer of parisons therebetween in such manner that at least three charges of glass may be simultaneously in the process of formation into completed articles, one in the blank mold, a second in the transfer apparatus and out of contact with any body mold surface, and a third in the blow mold.

A further specific object of the present invention is to provide a duplex transfer means cooperable with the blank and blow molds alternately in the transferring of parisons therebetween and operative to support those parisons out of contact and out of registry with any body mold surfaces for the purpose of reheating by permitting the internal heat of the glass to soften the chilled skin thereof.

A further object of the present invention is to provide apparatus of the type above mentioned and for the purpose of carrying out a multiple overlapping cycle wherein timing means are provided by which a desired cycle may be carried out by the device for forming different types of hollow glass articles.

A further specific object of the present invention is to provide apparatus generally of the character above set forth in which provision is made for the adjustment of some or all of the various forming operations as to timing of the starting, stopping, and/or duration.

Other and more specific objects of the present invention will become apparent from a reading of the following specification and appended claims when taken in connection with the accompanying drawings in which:

Fig. 6 is a fragmentary view principally in vertical section showing a modified form of blank forming mechanism of the type known as "plunger settle".

Figure 1:
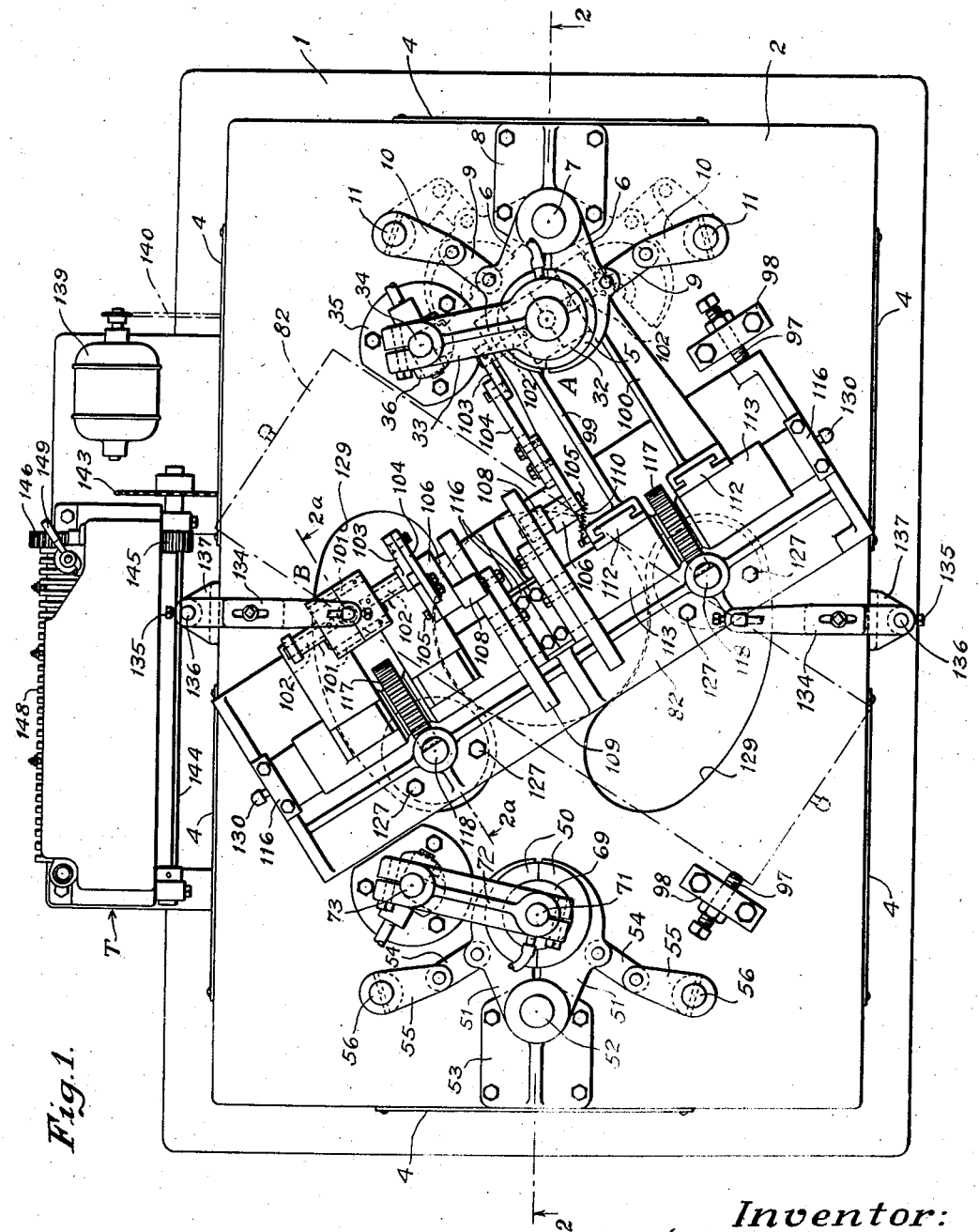
Figure 1 is a plan view of one form of apparatus embodying my invention certain positions of some of the parts indicated in dotted outline.

In Figs. 1 to 5 of the accompanying drawings, I have shown one form of machine by which my methods may be carried out and embodying a triple overlapping cycle as above set forth. As shown, the machine is of the stationary type mounted upon a base 1 which may be stationary, or which may be mounted upon wheels (not shown) for movement about the factory, as is customary with many glass forming machines. The base 1 may be formed as a casting of suitable metal, and as shown supports another box-like base member or casting 2, which is provided with lateral openings 3 for decreasing its weight and permitting access into the interior thereof, these openings being closed by suitable plates 4 of sheet metal or other suitable material. The various forming instrumentalities hereinafter to be specifically described and the timing means may be suitably mounted on or attached to the base members 1 or 2.

As shown, there is provided a blank mold 5 made in complementary halves which are held in holders 6 pivoted upon a common pivotal shaft 7 which is secured rigidly in a suitable bracket 8 secured to the base member 2.

I have shown pneumatic means for opening and closing the blank mold 5 although I contemplate that any suitable means may be employed for this purpose. The means shown are of the same general character of these shown and described in the Ingle Patent 1,911,119 above referred to. As shown, the mold holders 6 of the blank mold are connected by links 9 (Fig. 1) with crank arms 10 secured to the upper ends of a pair of vertical shafts 11 which are journaled in the base member 2 and in brackets secured to the base 1. Adjacent to the lower ends of the shafts 11 are secured crank arms 12 (Fig. 3) which are connected by links 13 with a crosshead 14 secured to the outer end of the piston rod 15 projecting from a pneumatic cylinder 16. Fluid pressure may be admitted to opposite ends of the cylinder 16 through the pipes 17 and 18 which may connect in a suitable manner (not shown) with the timing device generally indicated at T, hereinafter to be described. Thus upon movement of the piston within the cylinder 16 to the right, as seen in Figs. 2 and 3, the shafts 11 will be rocked through the linkage above described and illustrated in Fig. 3, which will in turn operate to open the halves of the blank mold 5. Upon movement of the piston in the cylinder 16 in the opposite direction, this mold will be closed.

Associated with the lower end of the blank mold as illustrated in Fig. 2 is a neck mold 19 preferably composed of complementary halves, as in the Ingle Patent 1,911,119 above referred to. The peculiar movements and mounting of this neck mold will be hereinafter described.

Also associated with the lower end of the blank mold and with the neck mold is a neck forming pin 20 which is projectable up into the neck mold, as shown in Fig. 2 for forming an initial cavity in the neck end of a blank or parison being formed. The construction of this neck pin and associated mechanism may, if desired, be exactly as shown in the Ingle Patent 1,911,119, but in the present instance I have shown a somewhat simpler construction. As illustrated, a sleeve member 21 is secured in an opening in the base member 2 as by bolts 22, with its hollow bore arranged in vertical alignment with the center axis of the blank mold 5. Arranged for vertical adjustment within the bore of the sleeve member 21 is a substantially cylindrical member 23, in the lower end of which is formed a cylinder 24 to receive a piston 25 on the upper end of the stem or rod of which the neck pin 20 is removably mounted.

The cylinder 24 has a removable lower head 26 secured thereto in any suitable manner. In this lower head 26 is threaded a vertical adjusting bolt 27 passing upwardly through a suitable aperture in the upper horizontal surface of the base member 2 and provided at its upper end with a squared portion 28 for engagement by a suitably shaped tool. Thus by applying a proper tool to the squared end 28 of the screw 27 and rotating this screw, the member 23 and the parts carried thereby may be bodily adjusted in a vertical direction through the bore of the member 21 so as to accommodate the neck pin mounting and operating device to blank molds of different lengths.

For moving the neck pin up into its operative position, fluid pressure may be supplied to the interior of the cylinder 24 beneath the piston 25 through a pipe 29 communicating with the interior of this cylinder at the lower end thereof and leading to the timer T in a manner not shown. When it is desired to withdraw the neck pin 20 out of the formed neck of the settled blank this may be done by means of air pressure if desired, but I have shown for this purpose a spring 30 positioned in a counterbore above the cylinder 24 in the member 23 and bearing at its upper end against the end of the counterbore and at its lower end against an upper shoulder on the piston 25, the spring 30 surrounding the piston rod of the piston 25. Thus the neck pin may be withdrawn downwardly out of the neck of a formed blank or parison upon the exhausting of pressure beneath the piston 25 through the pipe 29 and under the influence of the spring 30.

I contemplate that my novel method may be practiced with machines of various types including suction fed machines and that apparatus of various kinds including suction fed devices are to be considered as within the scope of this invention. The machine illustrated in the accompanying drawings is, however, adapted to be supplied with charges preferably from an automatic glass feeding device of any usual or well known type, either by direct gravity delivery or by the use of a chute system, such for example as that shown in the Ingle Patent No. 1,911,119. As shown, the blank mold 5 is provided adjacent to its upper end with a flaring contour, as illustrated at 31, for the purpose of guiding glass charges supplied from above downward into the mold. It is contemplated, however, that if desired, a separate charge-guiding funnel may be used as shown in the Ingle Patent No. 1,911,119 referred to.

Figure 2:
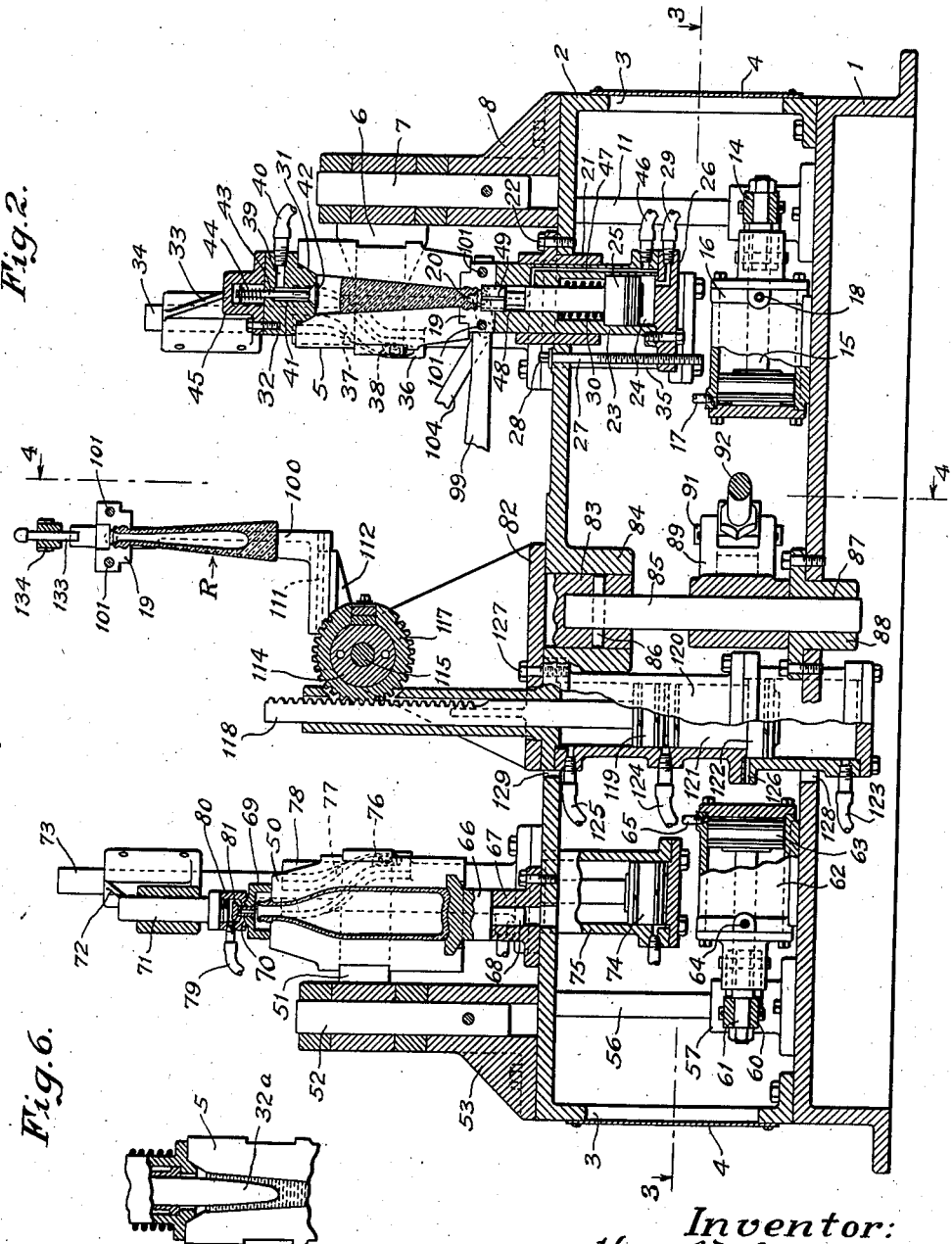
Fig. 2 is a view taken substantially in vertical section on the line 2—2 of Fig. 1.
Figure 3:
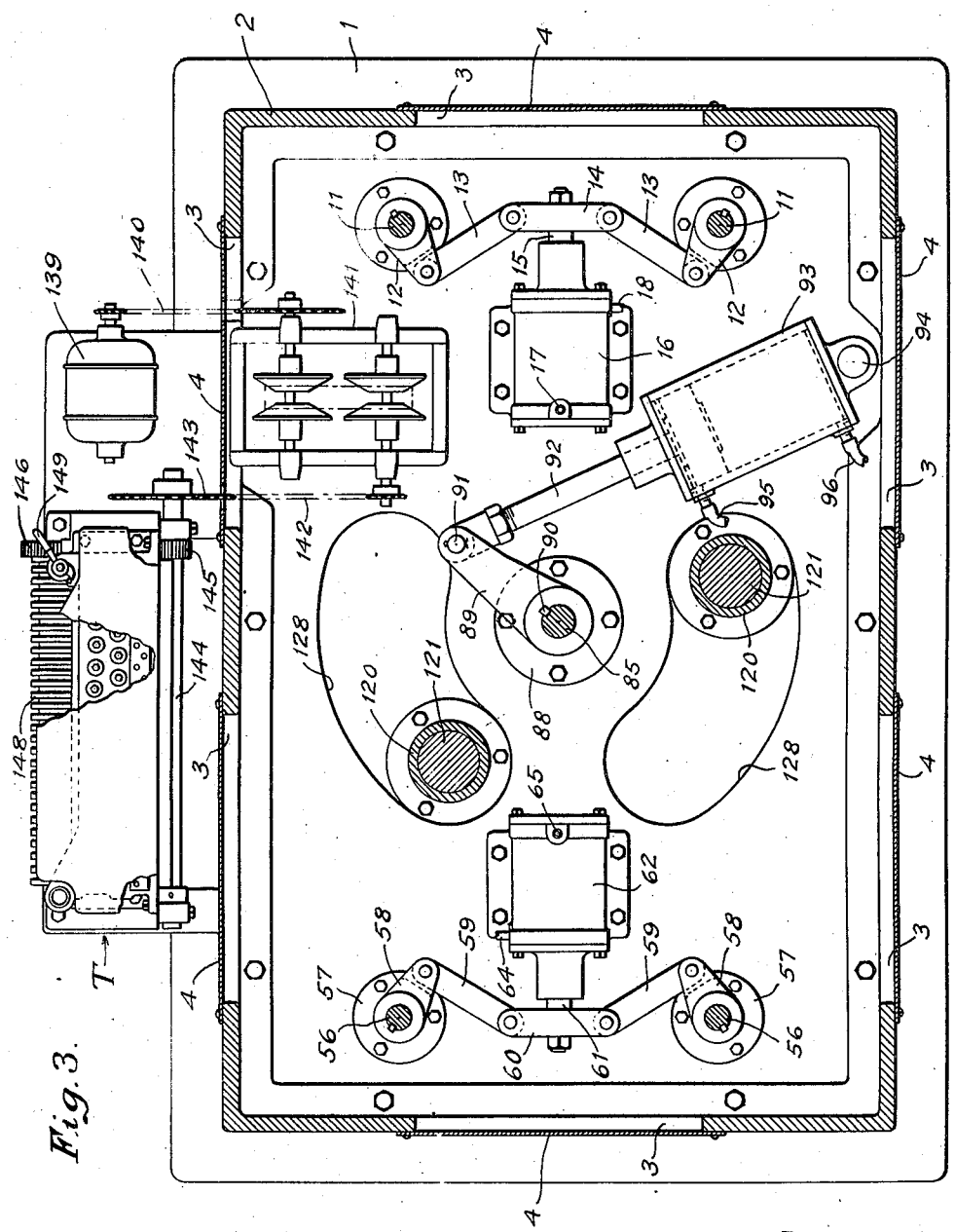
Fig. 3 is a view substantially in horizontal section on the line 3—3 of Fig. 2, certain parts being broken away to show the interior construction.
Figure 4:
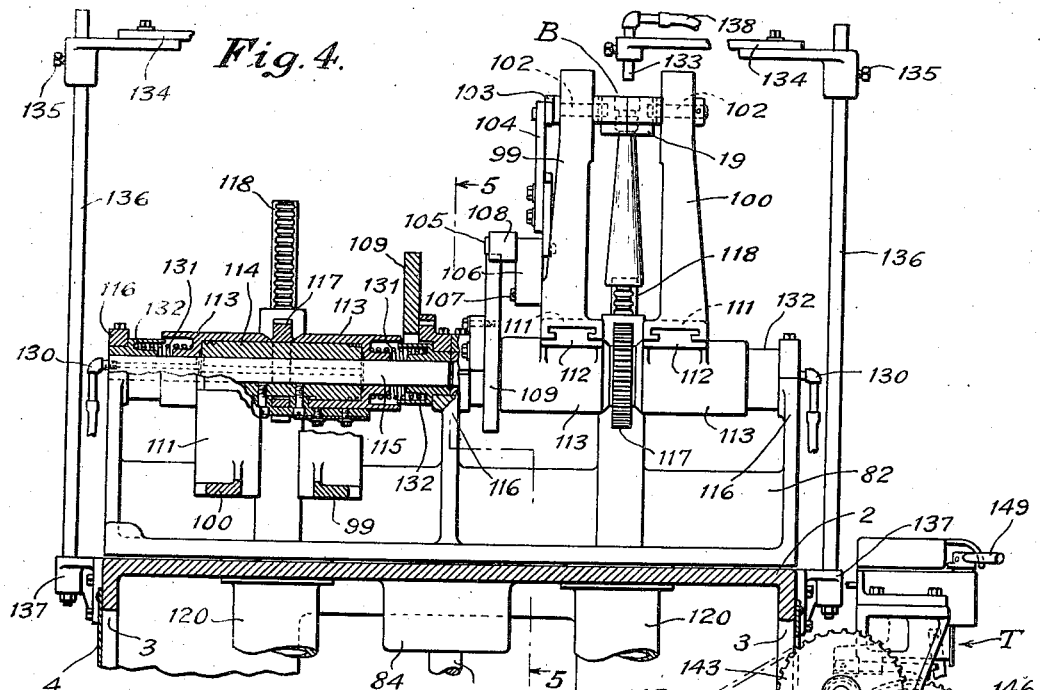
Fig. 4 is a view substantially in vertical section on the line 4—4 of Fig. 2 with some parts broken away and omitted.

Associated with the upper end of the mold 5 as shown in Figs. 1 and 2 is a combined settle blow head and counterblow baffle generally indicated at 32. This head is mounted upon the outer end of an arm 33 vertically adjustably secured to a vertical rod 34 which comprises the piston rod of a pneumatic cylinder 35. The cylinder 35 is secured to the base member 2 in any suitable manner and is supplied at its opposite ends with pneumatic pressure from the timer T. About the rod 34 outside the cylinder 35 is a partial or complete stationary sleeve portion 36 rigid or integral with a part of the cylinder 35, this portion 36 having formed therein a curved slot or groove 37 in which works a roller 38 secured to and projecting laterally from the rod 34. Thus upon upward movement of the piston in the cylinder 35, the head 32 will be moved upwardly and in a counterclockwise direction, as seen in Fig. 1, about the center of the rod 34, so as to move this head to an inoperative position to permit the introduction of a charge of glass vertically downward into the mold. This construction is also well known in the art and is illustrated more particularly in the Ingle Patent No. 1,911,119.

The interior construction of the head 32 is somewhat different from that shown in the Ingle patent referred to and as shown best in Fig. 2 includes a passage 39 to which pressure may be supplied through a flexible pipe 40 from the timer T when desired. This passage 39 enters the head laterally and communicates with a vertical passage or bore 41 controlled by a valve member 42 which is mounted upon the lower end of a valve stem 43 mounted co-axially of the bore 41. The valve is normally held closed against its seat by a helical compression spring 44 surrounding the valve stem and located in a recess formed within a head 45 secured to the head 32, the spring 44 extending between the upper side of the main member of the head 32 and a suitable detent or washer secured to the valve stem 43. Upon the admission of pressure from the timer T through the pipe 40 to passages 39 and 41, the valve 42 will be unseated against the compression of the spring 44, permitting this pressure to enter the cavity of the mold 5 and to settle blow the charge therein to form the neck within the neck ring 19 about the neck pin 20.

It is contemplated that any suitable type of head for settle blowing may be used, or settling may be accomplished by suction or by the use of a suitable downwardly moving tool as shown at 32a in Fig. 6, which illustrates a mechanical settling device adapted to operate according to the teaching of the process and by the apparatus disclosed in the copending application of Rowe, Serial No. 661,521, filed Mar. 18, 1933, now Patent No. 1,945,983, granted Feb. 6, 1934, this process being known in the art as "plunger settle". The particular means for accomplishing settling by pressure form per se no part of the present invention, the essential of the operation from the point of view of the present invention being that there be some means cooperable with the blank mold to form a hollow parison. This might also be accomplished by a straight pressing operation such as is well known in the art in press and blow type machines.

For completing the formation of a parison in the present machine, whether settle blowing, settle sucking, or both, or whether "plunger settle" be used, I contemplate that a counter-blowing operation will be used similar to that now in use in the prior art. This will be accomplished preferably by first withdrawing the neck pin 20 as above described and then admitting counterblowing pressure from the timer through a pipe 46 to a passage 47 formed or bored in the member 23 and communicating with an annular space 48 formed by a small diameter portion of the stem carrying the neck pin 20. This small diameter portion will be in registry with the upper end of the passage 47 upon the downward withdrawal of the neck pin 20 as will be understood from Fig. 2 of the drawings. The counterblowing pressure may then pass through a plurality of grooves 49 and around the neck pin 20 to the interior of the neck ring 19 to counterblow the charge within the parison or blank mold 5 and form a completed parison therein. Whatever type of settling may be used as above set forth, it is contemplated that a head the same as or similar to the head 32 will be used as a counterblow baffle. During this counterblowing there will, of course, be no pressure admitted to the head 32 through the pipe 40 and hence the valve 42 will be held closed by its spring 44.

Adjacent to the end of the base member 2 opposite that at which the blank mold 5 is disposed, there is a blow mold 50, which like the blank mold is arranged in complementary halves each carried by a holder 51. These holders are pivoted to swing about a fixed vertical axis pivot shaft 52 which is mounted in a bracket 53 secured to the base member 2.

For opening and closing the blow mold there is provided a mechanism substantially the same as that for the blank mold and including a pair of links 54 (Fig. 1) extending between the blow mold holders 51 and the outer ends of a pair of cranks 55, the cranks being secured to the upper ends of a pair of vertical rock shafts 56 journaled in the base member 2 and in suitable bearings 57 secured to the base 1. Adjacent to the lower ends of the rock shafts 56 there are provided cranks 58 (Fig. 3) secured to the rock shafts respectively and connected by links 59 to a crosshead 60 carried by the outer end of a piston rod 61 of a pneumatic cylinder 62, there being a piston 63 in the cylinder 62 secured to the piston rod 61 in the usual manner. Pressure may be admitted to the opposite ends of the cylinder 62 through pipes 64 and 65 from the timer T in a manner not specifically illustrated. Thus upon movement of the piston 63 in the cylinder 62 to the left, as seen in Figs. 2 and 3, the blow mold halves 50 will be opened and upon movement of this piston to the right, the blow mold halves will be closed. This construction is or may be substantially identical with that shown and described in the Ingle Patent No. 1,911,119.

The blow mold is provided with the usual removable and interchangeable bottom plate 66 which is preferably removably supported in position in a socket 67 secured to the base member 2. There is preferably a relatively loose support for the blow mold bottom so that it may be accurately positioned in and centered by the halves of the blow mold when they are closed around it. As shown, the blow mold bottom 66 is provided with a stud 68 adapted loosely to enter a recess in the socket member 67.

Associated with the blow mold is a suitable blow head generally indicated at 69 which may be mounted for floating movement as illustrated at 70 upon a stem 71 carried by the outer end of an arm 72 extending laterally from a vertical shaft 73. The shaft 73 comprises the piston rod of a piston 74 working in a pneumatic cylinder 75 to and from which pressure may be supplied and exhausted in a conventional manner from the timer T. The shaft 73 is provided with a cam roller 76 working in a curved slot or groove 77 in a sleeve or part sleeve 78 rigidly secured to the base or to the cylinder 72, so that upon upward movement of the piston 74 in its cylinder, the blow head 69 will be raised out of cooperative relation with the blow mold 50 and thereafter will be moved laterally in a clockwise direction, as seen in Fig. 1, about the center of the shaft 73.

Final blowing pressure may be admitted to the blow head 69 through a flexible pipe 79 to the interior of a chambered member 80 secured to the lower end of the stem 71 and may thence pass through lateral openings and a longitudinal bore in an extension member 81 securing the floating blow head 69 to the member 80 which is rigid with the stem 71. This construction is substantially conventional and no invention is predicated in the present case upon the details of this structure. The control of the blowing pressure through the pipe 79 will be effected by the timer T in a well known manner.

I provide means for transferring parisons from the blank mold to the blow mold 50, such means preferably being duplex in character so as to permit the apparatus as a whole to be used according to the triple overlapping cycle above referred to. As shown in the accompanying drawings, this means comprises an oscillable carrier 82 resting upon the upper surface of the base member 2 and having secured thereto or integral therewith a cylindrical extension 83 depending therefrom and received in a suitable bearing portion 84 preferably formed integral with the base member 2. In the extension 83 is secured a vertical shaft 85 as by the transverse pin 86, the lower end of the shaft 85 being journaled at 87 in a suitable bearing member 88 secured in the base member 1.

Figure 5:
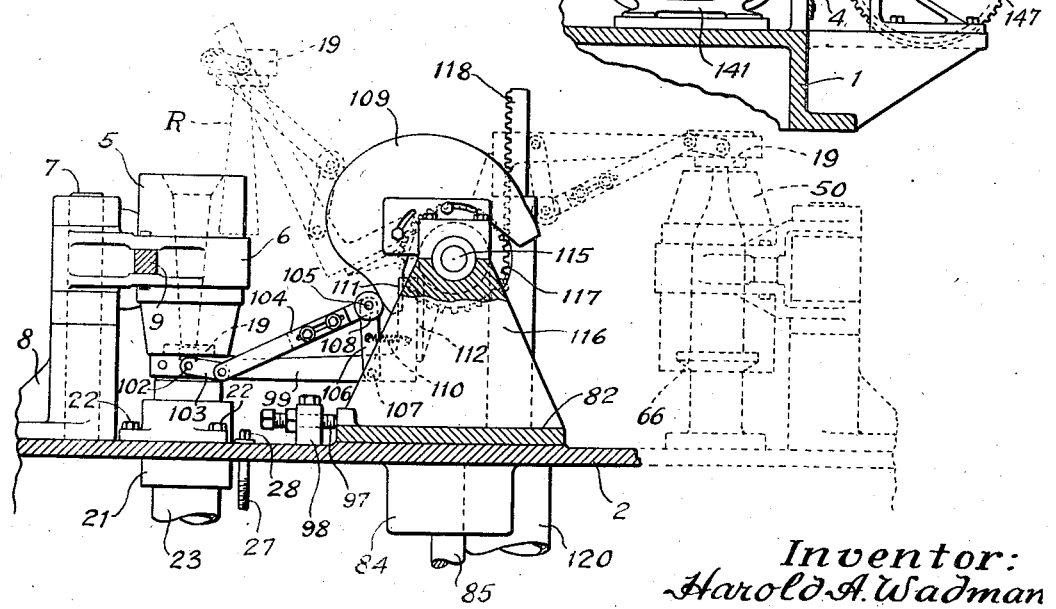
Fig. 5 is a view substantially in vertical section on the line 5—5 of Fig. 4 and indicating diagrammatically in dotted lines the operation and movements of the transfer mechanism.

Means are provided for oscillating the carrier 82 for the purposes hereinafter to be described, such means comprising an arm 89 (Figs. 2 and 3) keyed as at 90 to the shaft 85 and pivoted at its outer end at 91 to the outer end of a piston rod 92 projecting from a pneumatic cylinder 93, which in turn is pivoted at 94 to the base member 1 on a vertical pivot. Fluid pressure may be admitted to the opposite ends of the cylinder 93 through pipes 95 and 96 from the timer T for oscillating the carrier 82 as desired. Means are provided for determining the limits of movement of the carrier 82, such means as shown comprising adjustable stop screws 97 threaded through and locked in position in bracket members 98, which are secured to the upper surface of the base member 2, as shown in Figs. 1 and 5.

The carrier 82 supports two similar transfer means each carrying one of the neck rings 19 and each being of the type shown in my prior Patent No. 1,825,985, granted Oct. 6, 1931, except that there is provided a three position moving means to control the inversion and transfer by two independent movements instead of the two position single movement means disclosed in my prior patent. Inasmuch as the two transfer means each of which carries one of the neck rings 19 are substantially identical and each is constructed and arranged substantially as shown in my prior Patent No. 1,825,985, only one of these devices will be described herein, the same reference characters being used for corresponding parts of both mechanisms.

As before stated, the neck finish is imparted to the parison and it is supported during transfer and inversion by a neck mold or neck ring 19 (Fig. 2), this neck ring comprising complementary halves as in the usual arrrangement. The halves of the neck ring are preferably made removable to provide for the use of neck rings of different configurations, each neck ring half being removably mounted in a suitable holder. The holders are pivotally mounted on a horizontal axis in carrier arms 99 and 100 (Fig. 1). There is preferably provided suitable means for insuring that the neck ring holders have no relative rotation about their pivotal axis with respect to the arms 99 and 100, such means comprising rods or dowels 101 (Fig. 2) fixed in one of the holders or in one of the neck ring halves and projecting into suitable aligned apertures the other of the holders or halves. Thus the opening of the neck ring may be accomplished as will be hereinafter described by a straight line movement of the halves away from each other in a direction parallel to the pins or dowels 101. The pivotal connection between the neck ring holders and the arms 99 and 100 is made by providing stud members 102 on and rigid with the holders and suitably journaled in these arms. At the outer end of one of these stud members 102 preferably the one toward the center of the machine, there is provided a crank 103 rigidly secured to the stud so that rotation of the crank will effect the rotation of the associated neck ring with respect to the arms 99 and 100. The outer end of the crank 103 has pivoted thereto one end of an adjustable two part link 104, the other end of which carries a pivot shaft 105. The shaft 105 passes through one end of a link 106, the opposite end of which is pivoted at 107 to the arm 99. A cam roller 108 is also mounted on the shaft 105 and is held against a stationary cam 109 by a spring 110. Each of the arms 99 and 100 is L-shaped, the foot 111 of the L having an adjustable sliding connection with an arm 112 which permits an adjustment of the effective length of the offset of the arms 99 and 100 and thus permits the use of the mechanism with molds of varying heights. Each arm 112 is integral with one of a pair of cylinders 113 which are mounted in opposed relation on a piston 114 on which the cylinders may slide endwise, but with which they are constrained to rotate about a fixed shaft 115. The ends of the shaft 115 are secured in brackets 116 rising from the carrier 82. A segmental ring gear 117 is rigidly mounted on the piston 114 and is suitably keyed to the cylinders 113 so that the cylinders are required to rotate with the gear 117 while being permitted to slide longitudinally of the piston 114 with respect to that piston and to the gear 117. The gear 117 is in mesh with a vertical rack 118 formed on the piston rod of a piston 119 (Fig. 2), which is mounted for reciprocation in the upper, small diameter portion of a duplex air cylinder 120. A second piston 121 floats freely in the cylinder 120 and has a small diameter portion working in the upper small diameter portion of the cylinder and a large diameter portion shown at 122 slidable within the lower larger diameter portion of the cylinder as shown in the drawings (Fig. 2). Pressure may be admitted to and exhausted from the cylinder 120 at three vertically spaced points, as indicated through the pipe 123 communicating with the bottom end of the cylinder below piston 122, through pipe 124 communicating with the cylinder at a point just above the highest position of the piston 121 and below the intermediate position of piston 119 and through pipe 125 communicating with the cylinder at its upper end, all these pipes communicating with the timer T at their opposite ends in a manner not particularly illustrated. There is also an open vent 126 to the atmosphere from the interior of the cylinder 120 at the juncture of the smaller and larger diameter portions thereof. The cylinder 120 is suitably secured to the oscillable carrier 82 in any desired manner, for example, by bolts 127 as indicated in Figs. 1 and 2. Movement of the two cylinders 120 is permitted by forming in the horizontal surfaces of the base members 1 and 2 arcuate apertures 128 and 129 respectively, there being two such apertures in each of these base members to provide for the two cylinders, one for operating each of the pair of similar transfer devices. The movement is permitted by the use of flexible tubing in the communication between the cylinders and the timer.

Thus by the above described mechanism, which is in many respects the same as that of my prior Patent No. 1,825,985, the parisons will be transferred from the parison mold 5 to the blow mold by an "easy" or well balanced inverting motion. This motion, at least during the inversion proper of the parisons is a resultant of two simultaneous rotary movements, first of the neck rings bodily about the axis of the shaft 115, and second of the neck ring about the axis of the pins 102. As a practical matter, the center of inversion at any instant, therefore, lies somewhere between two planes, both perpendicular to the longitudinal axis of a parison being transfered and respectively through the opposite ends thereof. The use of apparatus providing a center of inversion between these two planes in practice results in such application of forces to the parison in respect to its center of gravity that distortion thereof due to centrifugal force incident to the inversion is minimized.

For opening and closing the neck rings fluid pressure may be admitted between the cylinders 113 and the piston 114 from the timer T, this fluid pressure being introduced axially of the shaft 115 through a pipe 130 (Figs. 1 and 4) which communicates with an axial bore in the shaft 115. This axial bore communicates in turn through lateral bores with the spaces between the relatively stationary piston 114 and the slidable cylinders 113. The cylinders are normally held in a position to retain their associated neck rings closed by suitable compression springs 131 extending between suitably formed axially stationary sockets 132 and recesses formed in the cylinders. Thus the admission of fluid pressure through the pipe 130 will operate to move the cylinders 113 away from each other, which will effect a corresponding movement of the arms 99 and 100 to separate the neck rings and release any glass held therein. Exhaustion of this pressure will permit a closing of the neck rings under the influence of the springs 131. This construction is shown and described in the Ingle Patent 1,911,119 and is substantially the standard construction now in use commercially in the "Hartford I. S." machine.

For supplying puff blowing pressure if and when desired to expand and assist in the elongation of the parison during the reheating operation and while laterally unconfined, I preferably provide nozzles directed downward toward the interior of the neck rings at the principal reheating positions. There are two of these nozzles, one arranged in operative relation and fixed in adjustable position with respect to each of the principal reheating stations. One of these nozzles is shown in Fig. 2 and at the upper right hand portion of Fig. 4 at 133, this nozzle being secured in the outer end of an adjustable length bracket member 134 which is also vertically and angularly adjustable as indicated at 135 upon the upper end of a standard 136 secured to a bracket 137 which is in turn secured to the base member 2. Fluid pressure may be supplied if and when desired to the nozzle 133 through a pipe 138 from the timer T in a manner not specifically illustrated.

The timer T is preferably operated from some suitable source of power as the electric motor indicated at 139 which is provided with a sprocket and chain connection 140 with a speed changing device 141 here diagrammatically illustrated as the conventional "Reeves drive", although it will be understood that any suitable and preferably adjustable variable speed changing device may be employed in this relation. Power is transmitted as indicated from the speed changing device 141 through the sprocket and chain drive 142 to a sprocket wheel 143 mounted on a shaft 144. This shaft is connected as by gears 145 and 146 to the driving shaft 147 of the drum 148 of the timer T. This timer is substantially identical with that used in the commercial "Hartford I. S." machine and is described in detail in the Ingle Patent No. 1,843,159 granted Feb. 2, 1932 and also in the Ingle Patents No. 1,843,160 granted Feb. 2, 1932 and No. 1,911,119 granted May 23, 1933. Briefly, the device comprises the drum as indicated at 148 which may be clutched to or declutched from the driving shaft 147 by a suitable pneumatic clutch (not shown) under the control of the valve operating lever 149, so as to stop the operation of the machine while the motor and speed changing device continue to operate. Suitable means (not shown) are preferably provided for transmitting power from the motor and preferably from the shaft 144 to an automatic glass feeding device associated with and adapted to supply charges to the forming machine. This arrangement is well known in the art and is fully illustrated and described in the Ingle Patent No. 1,911,119, so that no showing or description thereof is believed necessary at this time as it forms per se no part of the present invention. The drum 148 is provided with a plurality of undercut grooves in each of which one or more buttons may be arranged, there being preferably at least two buttons in each groove, one short button and one long button, and the associated mechanism comprising a valve and its operating mechanism associated with each groove, the parts being so constructed and arranged that when the valve actuating mechanism is engaged by the short button, pressure from the main supply line is supplied through the valve to the associated operating mechanism, this pressure being continuously supplied until the long button in the same groove engages the valve operating mechanism, at which time pressure is cut off from the associated operating mechanism and pressure in the line to that mechanism is exhausted to the atmosphere through the valve. The buttons are each adjustable universally around their associated grooves, so that any of the associated mechanisms may be supplied with pressure and pressure exhausted therefrom at any desired independently adjustable time in the cycle of the machine. The drum 148 is driven one revolution for each complete cycle or cycle of machine operation. The connection with an automatic glass feeding device, if such be used, is so arranged that this device will supply one or more charges of glass for each revolution of the drum 148.

Having described the various instrumentalities of my machine, I will now describe the complete operation and a characteristic cycle of operation for the machine.

Assuming that the parts of the machine are substantially in the position illustrated in Fig. 1, but without any glass being in the machine and with the combined settle head and counterblow baffle 32 raised and swung to one side, the neck ring associated with the blank mold 5 will be termed A for the purposes of this description of operation and the other neck ring B.

The first operation is the supplying of a charge of glass to the blank mold 5 which may be done, as above stated, either by direct delivery or by the use of some suitable chute system (not shown), the charge being guided into the mold by the flaring upper end 31 thereof. The first operation which takes place in the machine of Figs. 1 to 5 is the downward movement and lateral indexing of the head 32, the lateral component of the movement being about the center of the operating shaft 34 as an axis and the head moving to the position illustrated in Fig. 2. At this time the neck pin 20 is in the position illustrated in Fig. 2, due to the fact that pressure is being supplied to the cylinder 24 through the pipe 29 beneath the piston 25. At this time the neck ring B will be at the intermediate principal reheating position due to the fact that pressure will be supplied through the lower pipe 123 of its associated operating cylinder and exhausted from pipe 124. Pressure may also be supplied through the pipe 125, but this will have no effect in lowering the piston 119 due to the larger area of the piston 122 with respect to the piston 119 and due to the fact that the pressure is the same on the different area pistons.

The first operation on the glass in the machine of Figs. 1 to 5 is the supplying of pressure through the pipe 40 to settle blow the glass in the blank mold 5, which operation is accomplished in the usual manner, the valve 42 being unseated by the application of pressure through the pipe 40 as will be obvious from the drawings.

After the settle blowing operation has been completed on a charge of glass, the settle blowing pressure is cut off through the pipe 40 by the timer T and thereafter the pressure is exhausted from the cylinder 24 through the pipe 29, permitting the lowering of the piston 25 and the neck pin 20 associated therewith under the influence of the spring 30.

Counterblowing pressure may then be supplied from the timer T through the pipe 46, the passage 47, the annular space 48, and the passages or grooves 49 and around the retracted neck pin 20 to the interior of the neck ring to counterblow the parison up against the counterblow baffle 32. This counterblowing operation takes place for a predetermined but adjustable time, under the control of the timer T.

Once the counterblow pressure has been cut off, the parison has been completed in the blank mold 5. The head 32 may then be raised and swung to one side and the blank mold 5 opened to free the parison for transfer. The transfer and inversion of the parison then takes place from the position of the parison in the blank mold as seen at the left in Fig. 5 to the intermediate position R shown in dotted lines in that figure. At the start of this operation, the lower piston 121 of the associated transfer or inversion cylinder is at its uppermost position, as shown in Fig. 2, and the upper piston 119 is also at its uppermost position due to the supplying of pressure through the pipes 123 and 124 and the exhausting of pressure through the pipe 125. In order to move the parison from the position at which it is formed to the position R for reheating, pressure is exhausted through the pipe 124 and admitted through the pipe 125 to move the piston 119 and associated parts to the position shown in Fig. 2, the lower floating piston 121 remaining stationary during this movement. During this movement the parison is inverted due to the cam roller 108 riding up an incline on the cam 109 as will be seen from a consideration of Fig. 5. The parison may now commence to reheat with its axis vertical and depending from the neck ring A.

The next operation is the indexing of the transferring mechanism from the full line to the dotted line position, as seen in Fig. 1, which is accomplished by the admission of pressure to the cylinder 93 through the pipe 95 and the exhausting of pressure from that cylinder through the pipe 96, all under the control of the timer T. This brings the parison, the formation of which has been described, to its principal reheating position in vertical alignment beneath the puff blowing nozzle 133, seen at the lower central portion of Fig. 1, so that puff blowing air may, if desired, be supplied during any or all parts of the reheating operation to assist in the elongation and distention of the parison as may be desired.

Once the carrier 82 has been indexed as above set forth, the neck ring B may be positioned beneath the closed position of the blank mold which has been maintained open during this time by the mechanism previously described, including the cylinder 16. This movement of the neck ring B is accomplished by the admission of pressure through the pipe 124 of its associated cylinder and the exhausting of pressure through the pipe 125, the lower piston 121 being maintained in the position shown in Fig. 2 by the continued admission of pressure through the pipe 123. The blank mold 5 may then be closed and the neck pin 20 raised by the admission of pressure through the pipe 29 associated therewith. The blank mold and associated parts are now in a position to receive the next charge which will be formed in that mold and the neck ring B forthwith in the same manner as described for the formation of the first parison. During this time, the first parison is still reheating in neck ring A.

At any desired time before the second parison has been completed and is ready for transfer by neck ring B to the intermediate or reheating position or even after this transfer to the intermediate position has been completed and prior to the next indexing of the oscillating carrier 82, the now reheated first parison is transferred to the open blow mold which is closed around it by the mechanism described permitting it to be released by the opening of the neck ring A in a manner hereinabove described. This swinging of the neck ring A to a position over the final blow mold is effected by the continued introduction of pressure through the pipe 125 and the exhausting of pressure through the pipe 123. Pressure is also admitted through the pipe 124 once the piston 119 has moved to a position below the point at which pressure from pipe 124 enters the cylinder. This release of the parison in the blow mold is accomplished as above stated at any time prior to the next indexing of the carrier 82, the cycle being timed in accordance with the particular article being made by suitable adjustment of the various buttons on the drum 148.

Once the blow mold has closed and the reheated parison has been released by neck ring A, this neck ring may again be swung to the intermediate position by the admission of pressure to the pipe 123 of its associated cylinder and the exhausting of pressure through pipe 124, pipe 125 continuing to be open to pressure. The neck ring A is now in readiness for the next indexing of the carrier 82 and the return of this neck ring to position in cooperation with the blank mold for the formation of the third parison.

At any time after the reheated parison has been released in the blow mold the blow head 69 may be lowered and indexed to the position shown in Fig. 2 and blowing pressure may be supplied to the interior of the parison to blow it to final form. At this time the carrier 82 is again indexed to bring the second charge or parison, supported in neck ring B, to a position beneath the puff blowing nozzle 133 for reheating and puff blowing if desired. Neck ring A may then be returned to the blank forming position, the blank mold closed, and a third charge of glass may be supplied thereto, whereupon parison forming operations on this third charge may proceed as above set forth.

Thus under one set of circumstances at least there may be three charges of glass in process at one and the same time, one charge (the third) having been supplied to the blank mold and being enclosed therein. This charge may also be in some further step in the process of formation, that is, the settle blowing or the counterblowing; the second charge which was formed may be reheating in neck ring B at the position R, and the first charge which was formed in the same blank mold may be enclosed within the blow mold and at any stage of the operation therein, that is, either before, during, or after the application of final blowing pressure thereto. This is one specific example of a "triple overlapping cycle" as that term is used in this case and in the claims thereof.

In some instances, particularly in the making of quite small ware, the time required to effect the necessary mechanical movements hereinabove described may be so great with respect to the time required to perform the actual forming operations in the blank and/or final blow molds and/or reheating that there will not be a triple overlap as defined above. However, even under these circumstances the machine has a very distinct speed advantage over the prior art exemplified by the "Hartford I. S." machine and in fact may be operated at speeds up to 30% faster than that machine, even without the "triple overlapping" cycle as above defined, due to the fact that the manufacture of articles has now been made independent of the reheating time to a major extent. Also the present machine is so constructed and arranged that the appearance quality of the articles made, which depends to a major extent upon the effectiveness of the reheating of the parisons, is made substantially independent of speed, so that articles may be produced up to a limit of speed of the machine without any sacrifice in the appearance quality of the completed articles. This is the first machine to my knowledge which has this advantage.

It will be understood that the principles of my invention considered broadly are not limited to the particular machine herein shown, or even to a stationary type of machine, but may be included in rotary type machines with one or more turrets, or with the same or unequal numbers of blank and blow molds. Furthermore, if these principles be included in a rotary type machine they are applicable to machines which are intermittently or continuously rotated.

Many other modifications may be made, all within the spirit and scope of this invention, certain of which will present themselves to the mind of one skilled in the art. I do not wish to be limited therefore except by the scope of the appended claims which are to be construed as broadly as the state of the prior art permits.

I claim:

1. Apparatus for forming hollow glass articles, comprising a blank mold adapted to be supplied with charges of plastic glass, a blow mold, said blank mold and said blow mold cooperating solely with each other, means for forming a charge of glass supplied to said blank mold into a parison therein, means for removing the parison so formed from the blank mold and for suspending it for reheating out of contact and out of registry with any body mold surface and thereafter for moving the reheated parison to a position to be enclosed by said blow mold, means for blowing a reheated parison to final form in said blow mold, and means for timing the operations of all the aforesaid means in such manner that there is a time during each cycle of machine operation in which at least three charges of glass, all of which were supplied to said blank mold, are in the process of formation.

2. Apparatus for forming hollow glass articles, comprising a blank mold adapted to be supplied with charges of plastic glass, a blow mold, said blank mold and said blow mold cooperating solely with each other, means for forming a charge of glass supplied to said blank mold into a parison therein, means for removing a parison so formed from the blank mold and for suspending it for reheating out of contact and out of registry with any body mold surface and thereafter for moving the reheated parison to a position to be enclosed by said blow mold, means for blowing a reheated parison to final form in said blow mold, and means for timing the operations of all the aforesaid means in such manner that there is a time during each cycle of machine operation in which at least two charges of glass, all of which were supplied to said blank mold, are in the process of formation as follows, one having been supplied to said blank mold and being enclosed thereby, and at least one other reheating as aforesaid.

3. Apparatus for forming hollow glass articles, comprising a blank mold adapted to be supplied with charges of plastic glass, a blow mold, a pair of neck rings alternately cooperable with said blank mold, means for forming a charge of glass supplied to said blank mold into a parison in said blank mold and one of said neck rings, means for moving said neck rings in separated paths, one end of each of said paths being a position in cooperative relation with said blank mold and the other end of each of said paths being a position in cooperation with said blow mold, means for moving said neck rings in their respective paths and in a manner such that a neck ring carrying a formed parison may suspend the parison for reheating out of contact and out of registry either with said blank mold or said blow mold for a predetermined period of time, means for blowing a reheated parison to final form in said blow mold, and means for timing the operations of all the aforesaid means in such manner that there is a time during each cycle of machine operation in which three charges of glass, all of which were supplied to said blank mold are in process of formation, the first having been supplied to said blank mold with one of said neck rings in cooperative relation therewith and being enclosed thereby, the second reheating while suspended from the other of said neck rings at an intermediate position in its path, and the third being enclosed within said blow mold.

4. Apparatus for forming glass articles, comprising a blank mold and a blow mold mounted in a predetermined spaced relation to each other, means for transferring parisons from the blank mold to the blow mold comprising means for gripping the neck end portion of a parison, and means for moving the gripping means from a position in cooperative relation in the blank mold to a position in cooperative relation with the blow mold, the last named means including a duplex pneumatic cylinder having bores of different diameters in different parts thereof and pistons in each part of the cylinder respectively, means mechanically interconnecting one of said pistons with said gripping means and so constructed and arranged that movement of the piston to which it is connected is operative to move said gripping means, the other of said pistons floating in the cylinder and being operative to engage and move the first named piston, and means for supplying pneumatic pressure to at least three spaced points longitudinally of said cylinder, whereby said gripping means may be moved at will to a position in cooperative relation with the blank mold, an intermediate position in which a parison held in the gripping means is out of registry with either of said molds and a position in cooperative relation with the blow mold.

5. Apparatus for forming hollow glassware, comprising a blank mold mounted in permanently inverted position, a blow mold spaced from said blank mold and mounted in permanent neck-up position, said blank mold and said blow mold being fixed relative to each other, duplex transfer and inverting means interposed between said blank mold and said blow mold, which are arranged to transfer glass parisons from said blank mold to said blow mold through different laterally spaced indirect paths and during at least a portion of such transfer movement to invert parisons held thereby, a neck ring carried by each of said transfer means and cooperable alternately with said blank mold for forming the neck portion of a parison and thereafter for supporting the parison by the neck thus formed during the transfer, means for operating each of said transfer means to cause it to move successively to at least three positions in one of which the neck ring is in cooperative relation with and below the blank mold, in a second of which the neck ring has been inverted and is at an intermediate position so that a parison held therein is out of registry with either of said molds, and in the third of which a parison held in the neck ring will be positioned so as to be enclosed by the blow mold, and means for independently opening and closing each of said neck rings.

6. Apparatus for forming hollow glass articles, comprising a blank mold and a blow mold mounted in fixed relation to each other, the blank mold being mounted in permanent neck-down position and the blow mold in permanent neck-up position, duplex transfer mechanism interposed between the blank mold and blow mold positions, said transfer mechanism comprising two pairs of neck gripping means, each adapted to be moved between a position in cooperation with the blank mold and a position in cooperation with the blow mold, and said neck gripping means being movable as aforesaid through different laterally spaced paths, moving means for the two pairs of neck gripping means including means for independently swinging each neck gripping means about a substantially horizontal axis, means for swinging both neck gripping means simultaneously about a substantially vertical axis, means for independently opening and closing each neck gripping means, and means for inverting the neck gripping means with respect to the horizontal during a part only of the movement thereof about their respective horizontal axes and during the remainder of their movement for maintaining the respective neck gripping means and parisons carried thereby in a vertical position.

7. Apparatus for forming hollow glassware, comprising a blank mold and a blow mold each arranged to close about a vertical axis spaced laterally from each other on substantially the same working level with the blank mold in permanent neck-down position and the blow mold in permanent neck-up position, duplex transfer mechanism for transferring glass parisons from the blank mold to the blow mold through laterally spaced paths which are respectively substantially wholly on opposite sides of the line of centers of the blank mold and blow mold respectively, a carrier for the duplex transfer mechanism mounted for oscillatory movement about a fixed vertical axis located substantially in a vertical plane including the axes of the blank and blow molds and spaced substantially midway between those axes, each of the duplex transfer mechanisms including a neck gripping means mounted for rotation about a substantially horizontal axis on said carrier, means for rotating the neck gripping means about said horizontal axis, means for mounting each of said neck gripping means for movement about a horizontal axis with respect to its carrying means which is rotatable about the first named horizontal axis, means for independently controlling the rotated position of each of said neck gripping means about the last named horizontal axes and arranged to cause the inversion of the neck gripping means and a parison carried thereby during the initial portion of the transfer from the blank mold to the blow mold, means for thereafter causing each of the neck gripping means and the parison carried thereby to move with the axis of the parison maintained vertical through the remainder of the transfer movement to the blow mold, the rotating means for the neck ring about the first named horizontal axis including a duplex pneumatic cylinder associated with each of the neck gripping means, oscillatable with said carrier and arranged to cause each of the neck gripping means to move about the first named horizontal axis in two distinct movements in the first of which the neck gripping means is moved from a position in cooperation with the blank mold to an intermediate position and simultaneously inverted about its respective second named horizontal axis to suspend the parison from the neck gripping means in such intermediate position, and in the second of which the parison thus suspended is caused to move with its axis maintained vertical to a position to be enclosed by said blow mold, and means for independently opening and closing each of said neck gripping means so that a parison may be released in said blow mold and the neck gripping means by which it was transferred may thereafter be returned to cooperative relation with said blank mold.

8. Apparatus for forming hollow glass articles, comprising a blank mold mounted in permanent neck-down position, a blow mold laterally spaced from said blank mold and mounted in permanent neck-up position, said blank mold and said blow mold being mounted in fixed relation each to the other and on substantially the same working level, independent means to open and close said blank mold and said blow mold, a pair of neck rings cooperable alternately with said blank mold, a neck pin arranged for cooperation with said blank mold, a combined settle blow head and counterblow baffle arranged to move to and from cooperative relation with the upper end of said blank mold, means for admitting settle blowing air to said blank mold through said head, means for thereafter drawing said neck pin, means for then supplying counterblowing air through said neck ring to counterblow the glass in the blank mold to hollow form against said head and complete the formation of a parison in said blank mold and one of said neck rings, a carrier for said neck rings arranged for oscillatory movement about a vertical axis intermediate the blank and blow molds and substantially in a vertical plane including the axes of said molds, means for oscillating said carrier about its vertical axis, two pairs of arms mounted for rotation about a horizontal axis on said carrier and each arm carrying one-half of one of said neck rings, duplex piston and cylinder devices movable with said carrier for independently rotating said pairs of arms respectively about said horizontal axis on said carrier between three positions, in one of which a neck ring carried by said arms is in cooperative relation with the blank mold, an intermediate position in which the neck ring carried by this pair of arms is positioned so as to suspend a parison out of registry with either of said molds and with its axis vertical, and a third position in which the neck ring carried by this pair of arms is positioned in cooperative relation with said blow mold, independent means for separating the arms of each pair to open and close their respective neck rings, a horizontal pivotal mounting between each pair of neck rings and the arms by which it is carried, cam means to control the rotative position of each neck ring with respect to its carrying arms about its horizontal pivot, means for blowing a parison to final form in said blow mold, and timing means for all the aforesaid means so constructed and arranged that at one time during each machine cycle three charges of glass may be simultaneously in the process of formation into completed articles, one having been supplied to said blank mold with which one of said neck rings is cooperating and being enclosed thereby, a second which was formed into a parison in said blank mold being suspended from the other of said neck rings in an intermediate position between the blank and the blow molds and out of registry with either of said molds for reheating the parison, and the third which was earlier formed into a parison in said blank mold being enclosed within said blow mold.

9. Apparatus for forming hollow glass articles, comprising a fixed base, a blank mold mounted on a permanent vertical axis on said base in neck-down position, pneumatic means for opening and closing said blank mold, a blow mold mounted on said base on a permanent vertical axis and neck-up position spaced from and on substantially the same working level as said blank mold, pneumatic means for opening and closing said blow mold, an oscillatory carrier positioned on said base on a fixed vertical axis substantially midway between said blank mold and said blow mold, pneumatic means for oscillating said carrier, two pairs of neck ring carrying arms mounted on said carrier for movement about a horizontal axis with respect thereto, three position pneumatic means for independently oscillating each pair of arms about said horizontal axis with respect to said carrier, complementary neck ring portions carried by each of said pairs of arms and arranged for pivotal movement about a horizontal axis with respect to the carrying arms, cam means for independently controlling the position of each neck ring with respect to its carrying arms about the axis therebetween, the neck rings, their carrying arms and said carrier being so constructed and arranged that each neck ring is movable between a position in cooperation with the blank mold, an intermediate position spaced laterally of the line of centers of the blank and blow molds, in opposite directions for the respective neck rings, and such that a parison suspended from the respective neck rings at the intermediate position depends vertically from its supporting neck ring and is out of registry with the blank and blow molds, and a third position in registry with said blow mold, the inversion of each neck ring with respect to its carrying arms taking place between its position in cooperation with the blank mold and its respective intermediate position and the neck rings being respectively maintained with their axes vertical during their movements from their respective intermediate positions to the position in cooperation with the blow mold, pneumatically operated means for forming charges of glass supplied to said blank mold into parisons, means for supplying puff blowing pressure to the parisons at the respective intermediate positions of the neck rings, pneumatically operated means for applying final blowing pressure to the interior of parisons within said blow mold, and pneumatic timing mechanism for all the aforesaid means and independently adjustable in the controlling of each of the aforesaid means, all of the aforesaid means including the timing mechanism being so constructed and arranged that there is a time during each cycle of machine operation in which three charges of glass, all of which were supplied to said blank mold, are simultaneously in process of formation, the first having been supplied to said blank mold with which one of said neck rings is in cooperative relation and being enclosed thereby, the second reheating in the other of said neck rings at the intermediate position thereof, and the third being enclosed within said blow mold.

10. Apparatus for forming hollow glass articles, comprising a blank mold adapted to be supplied with charges of plastic glass from above through its open bottom end, a blow mold, means for forming charges of glass supplied to said blank mold into parisons therein, means for inverting the parisons so constructed and arranged that the center of inversion will be maintained between two planes both perpendicular to the longitudinal axis of a parison and passing respectively through the opposite ends thereof, means for suspending the parison by its neck subsequent to the inversion for reheating it out of contact and out of registry with any body mold surface and thereafter for moving the reheated parison to a position to be enclosed by said blow mold, means for blowing reheated parisons to final form in said blow mold, and means for timing the operation of all the aforesaid means in such manner that there is a time during each cycle of machine operation in which three charges of glass, all of which were supplied to said blank mold, are simultaneously in the process of formation: one being enclosed in said blank mold, a second reheating as aforesaid, and the third being enclosed in said blow mold.

HAROLD A. WADMAN.